(12) United States Patent
Greco

(10) Patent No.: US 6,798,602 B2
(45) Date of Patent: Sep. 28, 2004

(54) WINDOW BASED DIRECTORY FOR MAGNETIC TAPE

(75) Inventor: Paul Merrill Greco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 10/178,715

(22) Filed: Jun. 25, 2002

(65) Prior Publication Data

US 2003/0235001 A1 Dec. 25, 2003

(51) Int. Cl.⁷ .............................................. G11B 15/18
(52) U.S. Cl. ..................................................... 360/72.2
(58) Field of Search .......................... 360/72.2, 71, 72.1; 711/4, 111, 206, 207, 221

(56) References Cited

U.S. PATENT DOCUMENTS

| | | | |
|---|---|---|---|
| 4,891,784 A | | 1/1990 | Kato et al. .................. 364/900 |
| 5,210,851 A | | 5/1993 | Kato et al. .................. 395/425 |
| 5,214,768 A | | 5/1993 | Martin et al. |
| 5,357,380 A | * | 10/1994 | Bailey et al. ................. 360/51 |
| 5,410,437 A | * | 4/1995 | Ogawa et al. ................ 360/61 |
| 5,412,791 A | | 5/1995 | Martin et al. |
| 5,414,570 A | * | 5/1995 | Fry et al. ...................... 360/48 |
| 5,566,032 A | * | 10/1996 | Cleveland et al. ......... 360/72.2 |
| 5,572,378 A | | 11/1996 | Schwarz et al. .............. 360/48 |
| 5,586,280 A | * | 12/1996 | Simms .......................... 711/4 |
| 5,602,686 A | * | 2/1997 | Shih ............................. 360/48 |
| 5,613,082 A | | 3/1997 | Brewer et al. .............. 395/404 |
| 5,946,677 A | | 8/1999 | Bullen ............................ 707/2 |
| 6,125,231 A | | 9/2000 | Yuen et al. .................... 386/83 |
| 6,266,679 B1 | | 7/2001 | Szalwinski et al. ......... 707/204 |
| 6,268,975 B1 | * | 7/2001 | Bickers ..................... 360/72.2 |
| 6,298,414 B1 | * | 10/2001 | Yoshida ...................... 711/111 |

FOREIGN PATENT DOCUMENTS

GB    2264373    8/1993    ........... G06F/12/14

OTHER PUBLICATIONS

"Simplified Interface for PABX Configuration", IBM Technical Disclosure Bulletin, vol. 35, No. 02, Jul. 1992, pp. 474–478.

"Magnetic Tape Storage Device", JAPIO Abstract of JP60–226086, 1985.

* cited by examiner

*Primary Examiner*—David Hudspeth
*Assistant Examiner*—James L Habermehl
(74) *Attorney, Agent, or Firm*—John H. Holcombe

(57) ABSTRACT

Directories are provided for data recorded on a magnetic tape in the form of files having data demarcation signals, such as filemarks. Data storage logic arranges a map of the tape in fixed regions; establishes a window at each intersection between fixed regions, the window extending into at least one of the regions; determines whether at least one data demarcation signal is located in a window; if so, selects and identifies the properties and location of one of the data demarcation signals as within the window. If no data demarcation signal is present, the directory indicates an absence of data demarcation signals within the window.

48 Claims, 7 Drawing Sheets

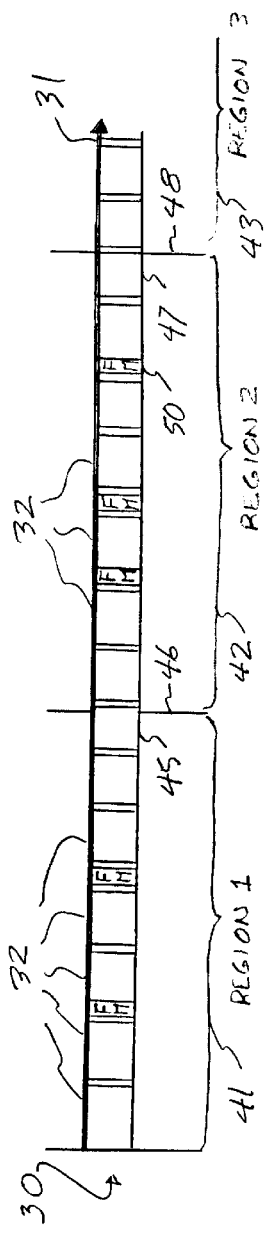
FIG. 3 - PRIOR ART
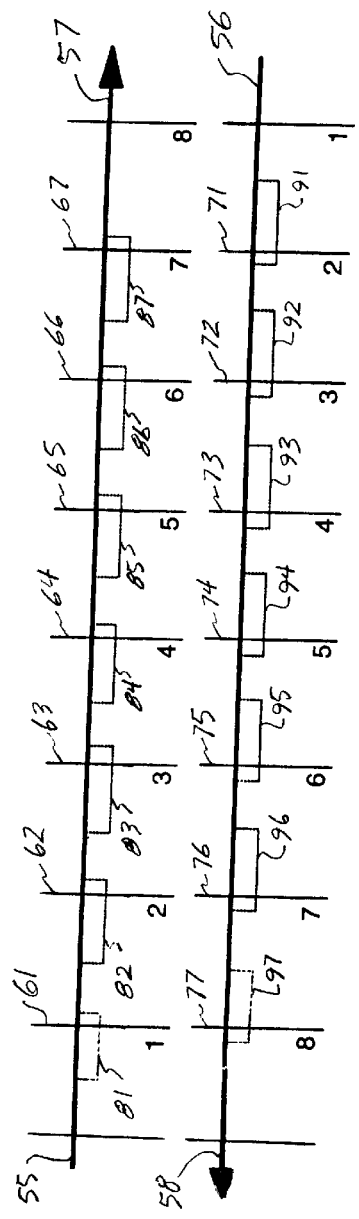
FIG. 4

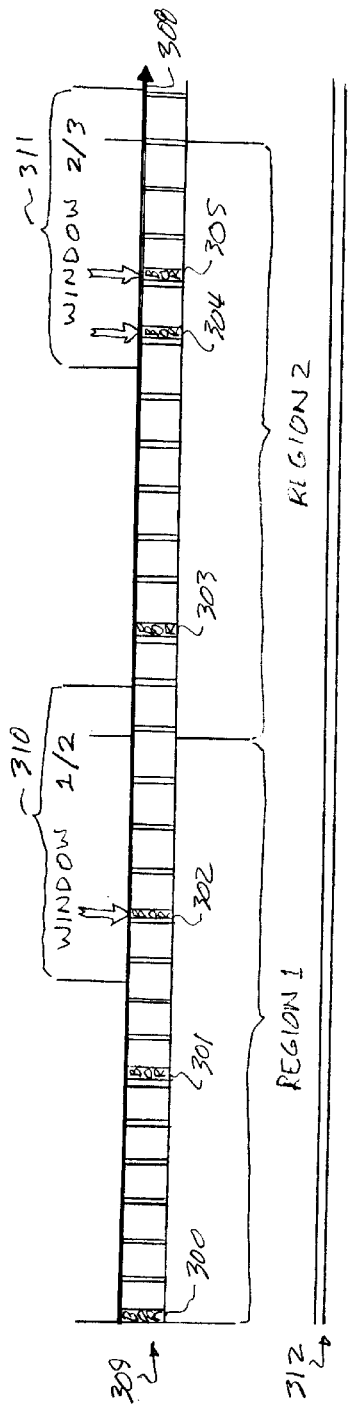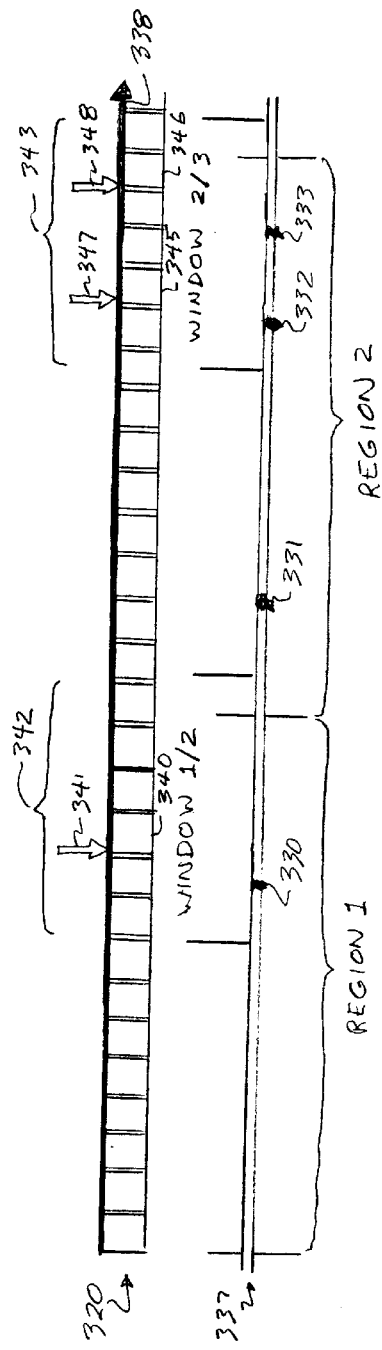
FIG. 10
FIG. 11

WINDOW BASED DIRECTORY FOR MAGNETIC TAPE

FIELD OF THE INVENTION

This invention relates to recording data in at least one longitudinal track on a magnetic tape data storage medium, the data having demarcation signals, and, more particularly, to providing a directory for the recorded data.

BACKGROUND OF THE INVENTION

Magnetic tape provides a means for physically storing data which may be archived or which may be stored in storage shelves of automated data storage libraries and accessed when required. When a magnetic tape is accessed, not all of the data stored on the magnetic tape is necessarily accessed, and not all of the data is necessarily accessed in sequence. Hence, a directory is often provided to identify and locate the data stored in the magnetic tape data storage medium. An example of a directory structure is discussed in U.S. Pat. No. 5,613,082, in which displacements of the magnetic tape measured by a tape reel tachometer are used to reference physical locations of data blocks. Once the displacement of a desired data block is identified from the directory, a high speed locate movement may be made to the vicinity of the desired data. Another example is a "filemark table" which indicates the location of a filemark. A "filemark" is a specialized recorded signal that is used at the end of a data file, and thus comprises a signal indicating demarcation between data files. Access from one data file to another may be made by a space command from the present filemark, plus or minus a defined number of filemarks.

In one example, the magnetic tape is provided in a removable data storage cartridge together with a cartridge memory, and the directory and/or filemark table is stored in the cartridge memory. In another example, the directory and/or filemark table is stored in a specified location on the magnetic tape.

One difficulty is that the directory and the filemark table are open ended. Hence, in the case of a large number of data files, the capacity of the memory could be exceeded, or the back and forth traversing of the magnetic tape to access the specified location of the directory and/or filemark table becomes highly inefficient.

Alternatively, only a few large data files may be stored on a portion of the magnetic tape, such that locating a desired data file may be difficult.

One approach is to divide the magnetic tape data storage medium into regions. As one example, where the magnetic tape comprises one or more longitudinal tracks, a track, or group of parallel tracks, (also called a "wrap" if the tracks are arranged in a serpentine pattern), may be arranged into a small number of fixed regions having fixed boundaries. The directory references data sets at the boundary between regions, detecting the name of a file from information in a data set. Thus, if the filemark of a desired file is not at the data set at the boundary, the beginning location of the file is not known, requiring a time consuming operation to go backwards to a known data file and space to the filemark demarking the desired data file. In U.S. Pat. No. 5,572,378, all data files are required to begin at a boundary to reduce access time, but the data storage becomes inefficient in such an arrangement, wasting space between the end of a file and a boundary.

SUMMARY OF THE INVENTION

In accordance with the present invention, data storage systems, methods, and removable data storage cartridges provide data storage directories for data recorded on a magnetic tape data storage medium.

In one embodiment, the data storage system comprises data storage logic, which:

- arranges a map of at least one longitudinal track of the magnetic tape data storage medium into a plurality of fixed regions;
- establishes a window at each intersection between the fixed regions, the window extending into at least one of the regions;
- determines whether at least one of the data demarcation signals is located in at least one of the windows;
- if at least one of the data demarcation signals is located in one of the windows, selects one of the data demarcation signals for the window; and
- identifies, in the directory, the selected data demarcation signal as within the window.

In a further embodiment, if no data demarcation signal is located in the window, the data storage logic identifies, in the directory, an absence of data demarcation signals within the window.

In a still further embodiment, the data demarcation signals comprise filemarks, and in another embodiment, wherein the data files are recorded in the form of at least one data record, the data records having secondary demarcation signals, the filemarks comprising primary demarcation signals. The data storage logic, additionally:

- determines whether a filemark primary demarcation signal is located in a window; and
- if no filemark primary demarcation signal is located in the window, determines whether a secondary demarcation signal is located in the window; if at least one of the secondary demarcation signals is located in one of the windows, selects one of the secondary demarcation signals for the window; and identifies, in the directory, the selected secondary demarcation signal as within the window.

In still another embodiment, where the magnetic tape data storage medium has longitudinal position signals encoded thereon, the data storage logic:

- arranges a map of at least one longitudinal track of the magnetic tape data storage medium into a plurality of fixed regions;
- establishes a window at each intersection between the fixed regions, the window extending into at least one of the regions;
- determines whether at least one of the data demarcation signals is located in at least one of the windows;
- if at least one of the data demarcation signals is located in one of the windows, selects one of the data demarcation signals for the window;
- reads the encoded longitudinal position signals of the magnetic tape data storage medium at substantially the location of a data set of the selected data demarcation signal; and
- identifies, in the directory, the selected data demarcation signal as within the window; and identifies, in the directory, the read location of the data set of the selected data demarcation signal.

For a fuller understanding of the present invention, reference should be made to the following detailed description taken in conjunction with the accompanying drawings.

BRIEF DESCRIPTION OF THE DRAWINGS

FIG. 3 is a diagrammatic representation of a track of magnetic tape in accordance with the prior art in which a track (or group of parallel tracks) is arranged into a small number of fixed regions having fixed boundaries;

FIG. 4 is a diagrammatic representation of a data storage medium of a data storage cartridge of FIG. 1 in accordance with an embodiment of the present invention, arranged into a plurality of fixed regions, with a window at each intersection between the fixed regions, the window extending into at least one of the regions;

FIG. 10 is a diagrammatic representation of a data storage medium of FIG. 4, illustrating alternative data demarcation signals; and FIG. 11 is a diagrammatic representation of a data storage medium of FIG. 4, illustrating further alternative data demarcation signals.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
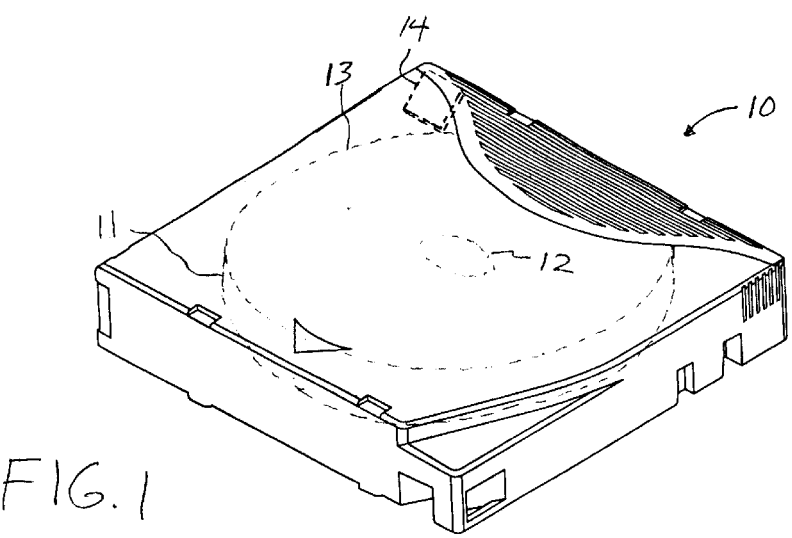
FIG. 1 is an isometric view of a data storage cartridge with a data storage medium and a cartridge memory shown in phantom.

Referring to FIG. 1, a data storage cartridge 10 is illustrated which comprises a magnetic tape data storage medium 11 wound on a hub 12 of a reel 13, and a cartridge memory 14. One example of a magnetic tape cartridge comprises a cartridge based on LTO (Linear Tape Open) technology. The cartridge memory 14, for example, comprises a transponder having a contactless interface, which is retained in the cartridge 10, for example, by being encapsulated by the cartridge when it is assembled, as is understood by those of skill in the art.

Figure 2:
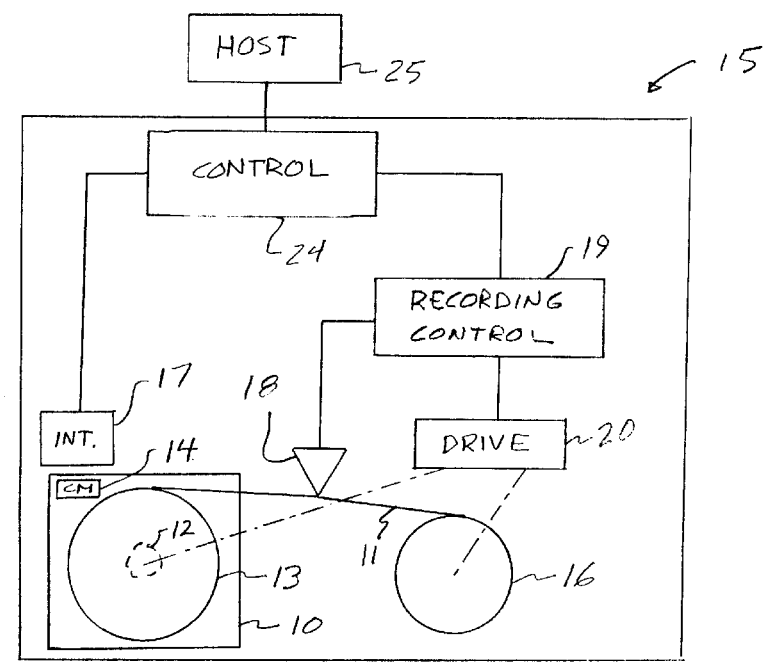
FIG. 2 is a block diagrammatic representation of a data storage system, such as a data storage drive for handling the data storage cartridge of FIG. 1.

Referring to FIG. 2, a data storage system 15, such as a magnetic tape data storage system, is illustrated. One example of a magnetic tape data storage system in which the present invention may be employed is the IBM 3580 Ultrium magnetic tape subsystem based on LTO technology, with microcode to perform operations to store data at, to provide a directory for, and to employ the directory to search for data of the data storage cartridge 10.

Magnetic tape data storage cartridges may comprise dual reel cartridges in which the tape is fed between reels of the cartridge, and may comprise single reel cartridges, such as the instant example, in which the magnetic tape medium 11 is wound on a reel 13 in the cartridge 10, and, when loaded in the data storage system 15, is fed between the cartridge reel and a take up reel 16 in the data storage system 15.

Typically, a magnetic tape data storage medium comprises one or more longitudinal tracks. The data is recorded as a string of data in a single track, or group of parallel tracks, that is read by the read/write and servo head 18. If the tracks are arranged in a serpentine pattern, such as is employed in the LTO technology, track or the group of tracks is called a "wrap". The data is typically recorded on the magnetic tape sequentially as a plurality of data sets with gaps between data sets, as is known to those of skill in the art. As an example, several thousand data sets may comprise a single wrap.

For the purpose of the invention, herein, the terms "data set", "data block", and "logical block" are treated as within a common definition. Additionally, the terms "longitudinal track", "group of parallel tracks", and "wrap" are treated as within a common definition. Those of skill in the art understand that the present invention is adaptable to various formats of the data.

The data storage system comprises a memory interface 17 for reading information from, and writing information to, the cartridge memory 14 of the data storage cartridge 10 in a contactless manner. A read/write system is provided for reading and writing information to the rewritable medium, and comprises a read/write and servo head 18 with a servo system for moving the head laterally of the magnetic tape medium 11, a recording control 19, and a drive motor system 20 which moves the magnetic tape medium between the reels 13 and 16 and across the read/write and servo head 18. The recording control 19 controls the operation of the drive motor system 19 to move the magnetic tape medium 11 across the read/write and servo head 18 at a desired velocity, and stops, starts and reverses the direction of movement of the magnetic tape, and operates the read/write head 18 to read the servo information and to read and/or write the data information on the longitudinal track(s).

A control system 24 communicates with the memory interface 17, and communicates with the read/write system, e.g., at the recording control 19.

The control system 24 comprises data storage logic with microcode to cause the data storage system 15 to store data at, to provide a directory for, and to employ the directory to search for, data of the data storage cartridge 10, as is known to those of skill in the art.

The illustrated and alternative embodiments of data storage systems are known to those of skill in the art, including those which employ two reel cartridges.

The control system 24 typically communicates with one or more host systems 25, and operates the data storage system 15 in accordance with commands originating at a host. When the host requests data files stored on a data storage medium, such as a magnetic tape, as discussed above, not all of the data stored on the magnetic tape is necessarily accessed, and not all of the data is necessarily accessed in sequence. Hence, a directory or filemark table is often provided to identify and locate the data stored in the magnetic tape data storage medium. The directory and/or filemark table may be stored in the cartridge memory 14, or alternatively, the directory and/or filemark table is stored in a specified location on the magnetic tape 11.

One example of the use of a directory in the prior art is illustrated in FIG. 3. A data storage medium, such as a magnetic tape, comprises one or more longitudinal tracks 30. The track or tracks 30 represents a string of data comprising a single track, or group of parallel tracks, that is written and read by the read/write and servo head 18 of FIG. 2 in the direction of arrow 31. If the tracks are arranged in a serpentine pattern, such as is employed in the LTO technology, the group of tracks 30 is called a "wrap". As discussed above, the data is typically recorded on the magnetic tape sequentially as a plurality of data sets 32 with gaps between data sets. Typically, several thousand data sets comprise a single wrap 30, and the illustration of FIG. 3 shows only a few of the many data sets in each region.

In FIG. 3, the magnetic tape data storage medium is divided into a small number of fixed regions having fixed boundaries, for the purpose of the directory. No physical delineation or arrangement of regions is necessary. In the example, the string of data is divided into regions, such as region 1, designated by reference numeral 41, region 2, designated by reference numeral 42, and region 3, designated by reference numeral 43. The directory references data sets at the boundary between regions, detecting the name of a file from information in a data set. Thus, the directory references data set 45 at the boundary 46 between regions 41 and 42, and references data set 47 at the boundary 48 between regions 42 and 43, etc. However, if the filemark of a desired file is not at the data set at the boundary, the beginning location of the file is not known. For example, the information of data set 47 indicates that it is a part of the data file designated by filemark 50, but there is no information about where the data file begins in region 42. All that is known is that data set 45 is a part of a different data file. Thus, a time consuming operation is required to go backwards to a known data file, such as the data file indicated by data set 45, and space to the filemark 50 demarking the desired data file.

FIG. 4 illustrates a data storage medium of a data storage cartridge of FIG. 1 in accordance with an embodiment of the present invention. The example of FIG. 4 illustrates two tracks 55 and 56 (which may comprise single tracks, or groups of parallel tracks, or wraps), which are written and read, e.g., by the read/write and servo head 18 of FIG. 2, respectively in the direction of arrow 57 and arrow 58.

In accordance with an embodiment of the present invention, the data storage logic 24 of FIG. 2 arranges a map of at least the longitudinal tracks 55 and 56 of the magnetic tape data storage medium into a plurality of fixed regions, having intersections 61–67 and 71–77 between the regions. The regions and intersections are logical, and not necessarily physical, entities. A window 81–87 and 91–97 is provided at each intersection between the fixed regions, the window extending into at least one of the regions. The windows additionally are logical, and not necessarily physical, entities.

In one embodiment, the longitudinal track, e.g., track 55, is read and/or written in a first direction 57, and the data storage logic 24 of FIG. 2 establishes the window, e.g., window 81, as extending into the region, e.g., region 1, located from the intersection, e.g., intersection 61, in the direction opposite the first direction 57.

In a further embodiment, optionally, the data storage logic 24 of FIG. 2 additionally establishes the window, e.g., window 81, as extending into the one region at least one quarter the total length of the region. This provides an enhanced opportunity to locate a data demarcation signal in the window, in the situation where the data demarcation signals are few. Alternatively, if it is likely that a large number of data demarcation signals will be encountered, the window may extend into the region a lesser extent.

Still further, the window, e.g., window 81, is established as additionally extending into the other of the regions, e.g., region 2, that is located in the first direction 57 from the intersection, e.g., intersection 61.

Figure 5:
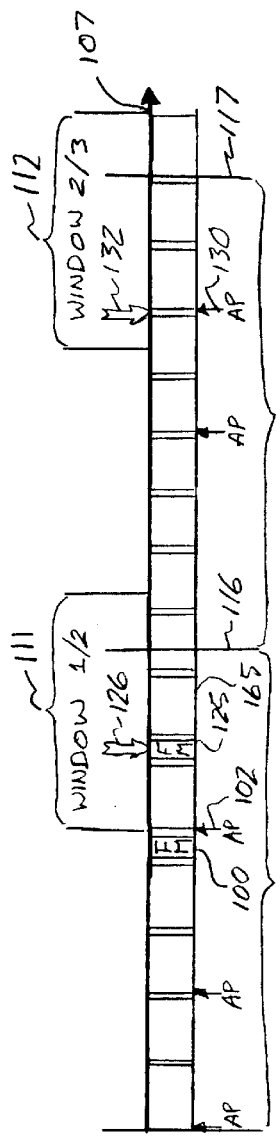
FIGS. 5 and 6 are diagrammatic representations of a data storage medium of FIG. 4, illustrating examples of filemarks and of record secondary demarcation signals.
Figure 6:
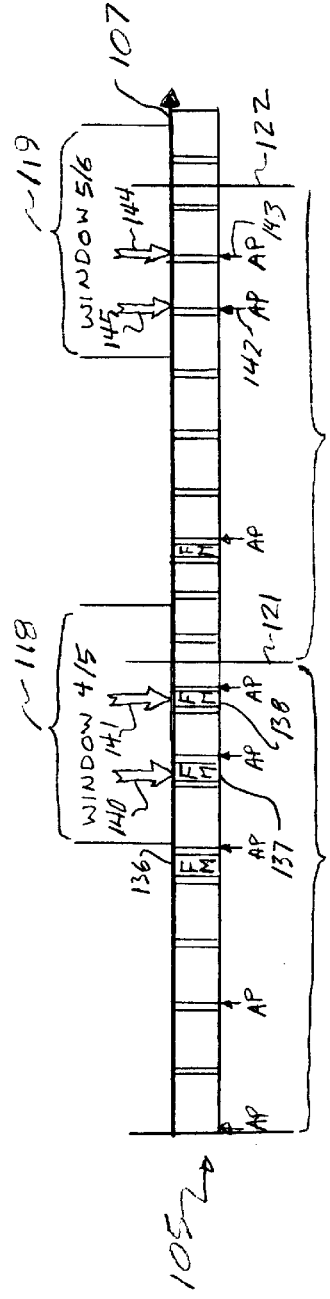

FIGS. 5 and 6 illustrate data demarcation signals indicating a demarcation between data files or data records. In one embodiment, the data demarcation signal is a filemark 100 that is used at the end of a data file, and thus comprises a signal indicating demarcation between data files. In another embodiment, the data demarcation signal is an access point 102 that is a physical location identified in a file table in the data. Thus, the file table for at least one data block must be read, and it will provide the location of the access point for the record. FIGS. 5 and 6 show only a few of the many data sets of a track, group of tracks, or wrap, such as track 105, whereas, typically, several thousand data sets comprise a single wrap.

In accordance with the present invention, as discussed above, the longitudinal track, e.g., track 105 of FIG. 5, is read and/or written in a first direction 107, and the data storage logic 24 of FIG. 2 establishes the windows, e.g., windows 111 and 112, as extending into the region located from each intersection, e.g., intersections 116 and 117, in the direction opposite the first direction 107. Thus, window 111 extends into region 1, and window 112 extends into region 2. Similarly, the longitudinal track, e.g., track 105 of FIG. 6, is read and/or written in the first direction 107, and the data storage logic 24 of FIG. 2 establishes the windows, e.g., windows 118 and 119, as extending into the region located from each intersection, e.g., intersections 121 and 122, in the direction opposite the first direction 107. Thus, window 118 extends into region 4, and window 119 extends into region 5.

The data storage logic 24 of FIG. 2 determines whether one or more of the data demarcation signals is located in the windows. In the example of FIG. 5, filemark 100 is located outside the window 111, and filemark 125 is located within the window. Thus, the data storage logic determines that filemark 125 is within window 111, as is illustrated by arrow 126. Since at least one of the data demarcation signals (filemark 125) is located in the window, the data storage logic selects the data demarcation signal 125 for the window, and identifies, in the directory, the selected data demarcation signal as within the window. No filemark is located within window 112. Hence, if no data demarcation signal is located in the window, the data storage logic identifies, in the directory, an absence of data demarcation signals within the window.

Alternatively, a plurality of types of data demarcation signals may be employed in accordance with the present invention. Thus, referring to FIG. 5, an access point 130 is located in the window 112. An access point, or other indicator of the start of a record, may comprise a data demarcation signal. Hence, the data storage logic determines that a data demarcation signal, e.g., the access point 130 is within window 112, as is illustrated by arrow 132. Since at least one of the data demarcation signals (access point 130) is located in the window, the data storage logic selects the data demarcation signal 130 for the window, and identifies, in the directory, the selected data demarcation signal as within the window.

Still alternatively, the data demarcation signals may be hierarchically arranged. For example, filemarks may comprise primary demarcation signals, and access points may comprise secondary demarcation signals. Thus, referring to FIG. 5, if no primary demarcation signal (filemark) is located in the window, e.g., window 112, the data storage logic determines whether a secondary demarcation signal (access point) is located in the window. If at least one secondary demarcation signal is located in the window, e.g., access point 130, the data storage logic selects the secondary demarcation signal 130 for the window, and identifies, in the directory, the selected secondary demarcation signal as within the window.

Referring to FIG. 6, filemark 136 is located outside the window 118, and filemarks 137 and 138 are located within the window. Thus, the data storage logic determines that filemarks 137 and 138 are within window 118, as is illustrated by arrows 140 and 141. Since at least one of the data demarcation signals (filemarks 137 and 138) are located in the window, the data storage logic selects one of the data demarcation signals 137 and 138 for the window. Any of the data demarcation signals may be selected in accordance with the present invention. In one embodiment, the data demarcation signal closest to the intersection between the fixed regions (filemark 138) is selected. In another embodiment, the data demarcation signal closest to the beginning of the window (filemark 137) is selected. The data storage logic identifies, in the directory, the selected data demarcation signal as within the window.

No filemark is located within window 119. Hence, if no data demarcation signal is located in the window, the data storage logic identifies, in the directory, an absence of data demarcation signals within the window.

Alternatively, if the data demarcation signals are hierarchically arranged as discussed above, referring to FIG. 6, if no primary demarcation signal (filemark) is located in the window, e.g., window 119, the data storage logic determines whether a secondary demarcation signal (access point) is located in the window. If at least one secondary demarcation signal is located in the window, e.g., access points 142 and 143, the data storage logic selects one of the secondary demarcation signals 130 for the window 119. As discussed above, any of the secondary demarcation signals within the window may be selected in accordance with the present invention. In one embodiment, the secondary demarcation signal closest to the intersection between the fixed regions (access point 143) is selected, as shown by arrow 144. In another embodiment, the secondary demarcation signal closest to the beginning of the window (access point 142) is selected, as shown by arrow 145. The data storage logic identifies, in the directory, the selected secondary demarcation signal as within the window.

Figure 7:
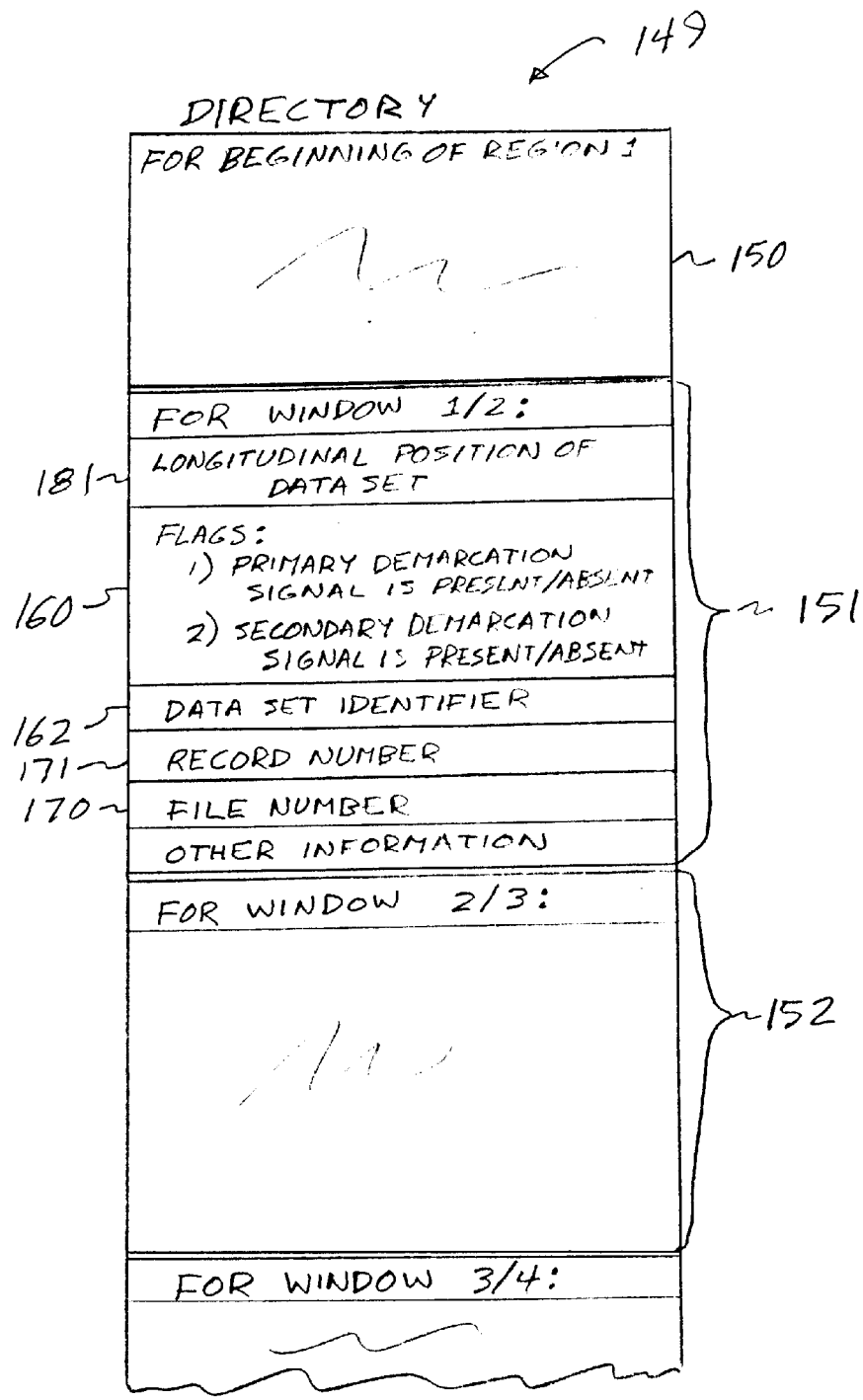
FIG. 7 is a diagrammatic representation of an embodiment of a directory for a data storage medium of FIG. 4 in accordance with an embodiment of the present invention.

An example of a directory 149 in accordance with the present invention is illustrated in FIG. 7. The first region is expected to begin subsequent to the logical beginning of tape, and to start with a file and to have a beginning of record at the first record of the file. Hence, area 150 illustrates an identification of the first file and record of the first region. Area 150 may not be explicitly contained in the directory 149, but may be implied or derived from beginning of tape information or prior region information. Subsequent regions employ the windows of the present invention. Thus, area 151 represents the identification of the selected data demarcation signal of the window at the intersection of two regions, for example, the intersection 116 of FIG. 5 between regions 1 and 2; area 152 represents the identification of the selected data demarcation signal of the window at the intersection 117 of FIG. 5 between regions 2 and 3; etc.

In the example of FIG. 7, the selected data demarcation signal is identified by a combination of flags and numbers. The flags 160 are illustrated for the hierarchical arrangement of data demarcation signals and identify the presence or absence of a primary demarcation signal and of a secondary demarcation signal. Thus, if a primary demarcation signal is present in the window and has been selected, the first flag will so indicate, and the second flag is ignored. If no primary demarcation signal is present in the window, the first flag will so indicate, and if a secondary demarcation signal is present and has been selected, the second flag will so indicate. If neither a primary or a secondary demarcation signal are present, the indication of an absence of data demarcation signals within the window is made by a combination of both flags.

Alternatively, if only one type of data demarcation signal is available for selection, only one flag 160 is employed, and the other flag is an option to allow addition of other data demarcation signals.

Still alternatively, a plurality of types of data demarcation signals may be employed, and may comprise a nonhierarchical arrangement, and a separate flag 160 employed for each type.

The data set, or equivalent, of the data demarcation signal is identified by some identifier 162, for example, by a sequence number or a logical block number. In the case of a filemark, e.g., filemark 125 of FIG. 5, the identified data set is that which immediately follows the filemark, e.g., data set 165. Still referring to FIG. 7, in the case of a filemark, since the following data set is identified, the file number 170 of the file for that data set is identified. Also, in the case of a filemark, the filemark designates the end of one file, the following data set is likely to be the first data set and first record of the next file. Thus, the file number 170 of the following data set is likely to be that of the next file.

Hence, the directory, by employing the selected data demarcation signal, provides an identification 170 of the beginning of a file.

Still referring to FIG. 7, additionally, the record number 171 of the following data set may also be provided.

If the flags 160 indicate that no primary demarcation signal (such as a filemark) is present, but that a secondary demarcation signal has been selected (such as access point 130 of FIG. 5), the file number 170 does not provide an identification of the beginning of a file. It does, however, identify the file in which the record is located. If the secondary demarcation signal is an access point or a beginning of a record indicator, the data set identified 162 is the data set having the access point or the beginning of a record indicator, and the record number 171 is that of the identified data set.

The data set identifier, file number and/or record number may be read from the file table, or from the data set itself.

Thus, even though a filemark of a desired file, or the beginning of a record, is not at the data set at the intersection between regions, the present invention selects a data demarcation signal and identifies the file and/or record at a selected data demarcation signal, thereby providing a closed directory, as opposed to open ended directories and filemark tables. Hence, even in the case of a large number of data files, the capacity of the memory is not exceeded.

Referring to FIG. 5, the magnetic tape data storage medium additionally provides a servo track 180 having longitudinal position signals encoded thereon, or an equivalent encoding of longitudinal position. The LTO format, discussed above, comprises a plurality of such servo tracks. Thus, the data storage logic, additionally reads the encoded longitudinal position signals of the magnetic tape data storage medium at substantially the location of a data set of the selected data demarcation signal; and identifies, in the directory, e.g., at area 151 of FIG. 7, the selected data demarcation signal as within the window; and identifies, in the directory, the location 181, e.g., at area 151, of the data set of the selected data demarcation signal.

Thus, even though a filemark of a desired file, or the beginning of a record, is not at the data set at the intersection between regions, the present invention identifies the file and/or record at a selected data demarcation signal within the window, and additionally identifies the longitudinal position of the data set of the selected data demarcation signal, thereby reducing the extent to which go backwards to a known data file and space to a desired data file or record, or in some cases eliminating the need to go backwards at all, greatly increasing the performance of locating the desired data set.

Figure 8:
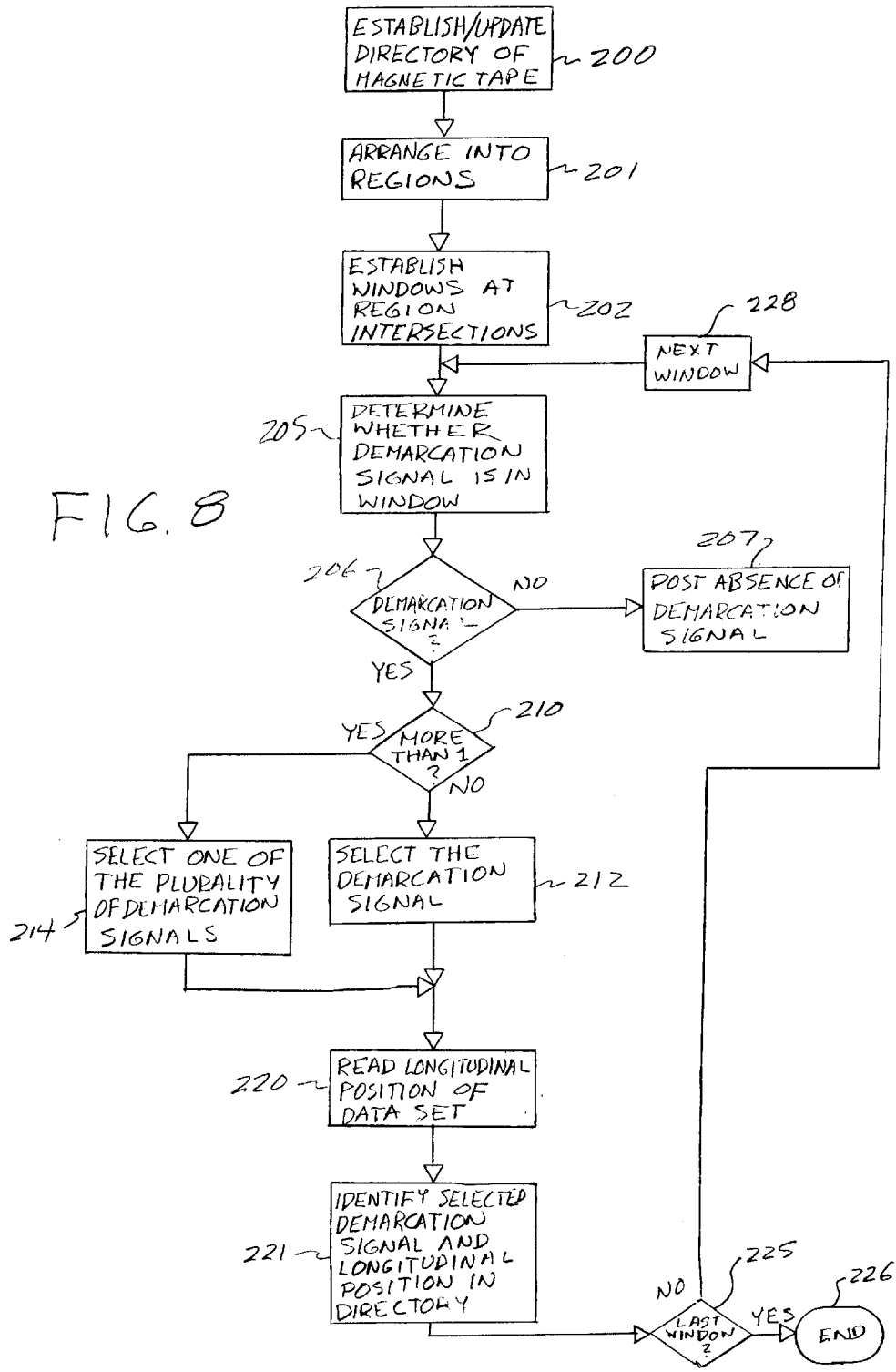
FIG. 8 is a flow chart depicting an embodiment of the method of the present invention for providing the directory of FIG. 7.

FIG. 8 illustrates an embodiment of a method in accordance with the present invention. The method of FIG. 8 assumes that there is no hierarchical arrangement of types of data demarcation signals. The establishment, or updating, of the directory begins at step 200. Step 201 comprises mapping the magnetic tape, or at least one longitudinal track of the magnetic tape data storage medium, by arranging the track, group of tracks or wrap into a plurality of fixed regions, which are logical, and not necessarily physical, entities. The fixed regions may be predetermined by the type of magnetic tape data storage medium, for example, by its length in terms of data storage capacity, or it may be predefined on the tape itself, such that step 201 comprises a lookup process.

In step 202, windows are established at the region intersections.

Thus, as discussed above with respect to FIG. 4, the data storage logic 24 of FIG. 2 arranges a map of at least the longitudinal tracks 55 and 56 of the magnetic tape data storage medium into a plurality of fixed regions, having intersections 61–67 and 71–77 between the regions. A window 81–87 and 91–97 is provided at each intersection between the fixed regions, the window extending into at least one of the regions. The windows additionally are logical, and not necessarily physical, entities.

As discussed above, in one embodiment, in step 202 of FIG. 8, the longitudinal track, e.g., track 55, is read and/or written in a first direction 57, and the window, e.g., window 81, is established as extending into the region, e.g., region 1, located from the intersection, e.g., intersection 61, in the direction opposite the first direction 57. In a further embodiment, optionally, the window, e.g., window 81, extends into the one region at least one quarter the total length of the region. Still further, the window, e.g., window 81, is established as additionally extending into the other of the regions, e.g., region 2, that is located in the first direction 57 from the intersection, e.g., intersection 61.

In step 205 of FIG. 8, the data storage logic 24 of FIG. 2 determines whether at least one data demarcation signal is located in a window. The first window may be the first encountered from the location of the tape when the tape is loaded in the data storage system 15 of FIG. 2. Step 206 comprises the result of the determination step 205. If no data demarcation signal was present, step 207 posts the absence of data demarcation signals for the window, for example, by setting flags 160 of the directory area 151 of FIG. 7 for that window to zero.

If step 206 of FIG. 8 indicates a determination that at least one data demarcation signal was present in the window, step 206 leads to step 210 to indicate whether more than one data demarcation signal was determined to be present in the window. If one data demarcation signal was determined to be present in the window, that data demarcation signal is selected in step 212. If more than one data demarcation signal was determined to be present in the window, a selection of one of the data demarcation signals is made in step 214. As discussed above, any of the data demarcation signals may be selected. In one embodiment, the data demarcation signal closest to the intersection between the fixed regions is selected, and in another embodiment, the data demarcation signal closest to the beginning of the window is selected.

In step 220, the data storage logic reads the encoded longitudinal position signals of the magnetic tape data storage medium at substantially the location of a data set of the selected data demarcation signal.

In step 221, the data storage logic identifies, in the directory, e.g., at area 151 of FIG. 6, the selected data demarcation signal as within the window by means of flag or flags 160; identifies the data set 162, the file 170, and the record 171; and identifies, in the directory, the location 181, e.g., at area 151, of the data set of the selected data demarcation signal, thereby providing the location of the selected data demarcation signal and the file or record at substantially the data demarcation signal.

Step 225 decides whether a determination has been made for all of the windows of the directory, and, if so, the process ends in step 226. If more windows are to be examined, step 225 proceeds to step 228 for the next window, and to repeat the determination at step 205. Thus, at step 226, the closed directory of the present invention has been completed, and, even in the case of a large number of data files, the capacity of the memory is not exceeded. Further, even though a filemark of a desired file, or the beginning of a record, is not at the data set at the intersection between regions, the present invention identifies the file and/or record at a selected data demarcation signal, and additionally identifies the longitudinal position of the data set of the selected data demarcation signal, thereby reducing the extent to which go backwards to a known data file and space to a desired data file or record, or in some cases eliminating the need to go backwards at all.

Figure 9:
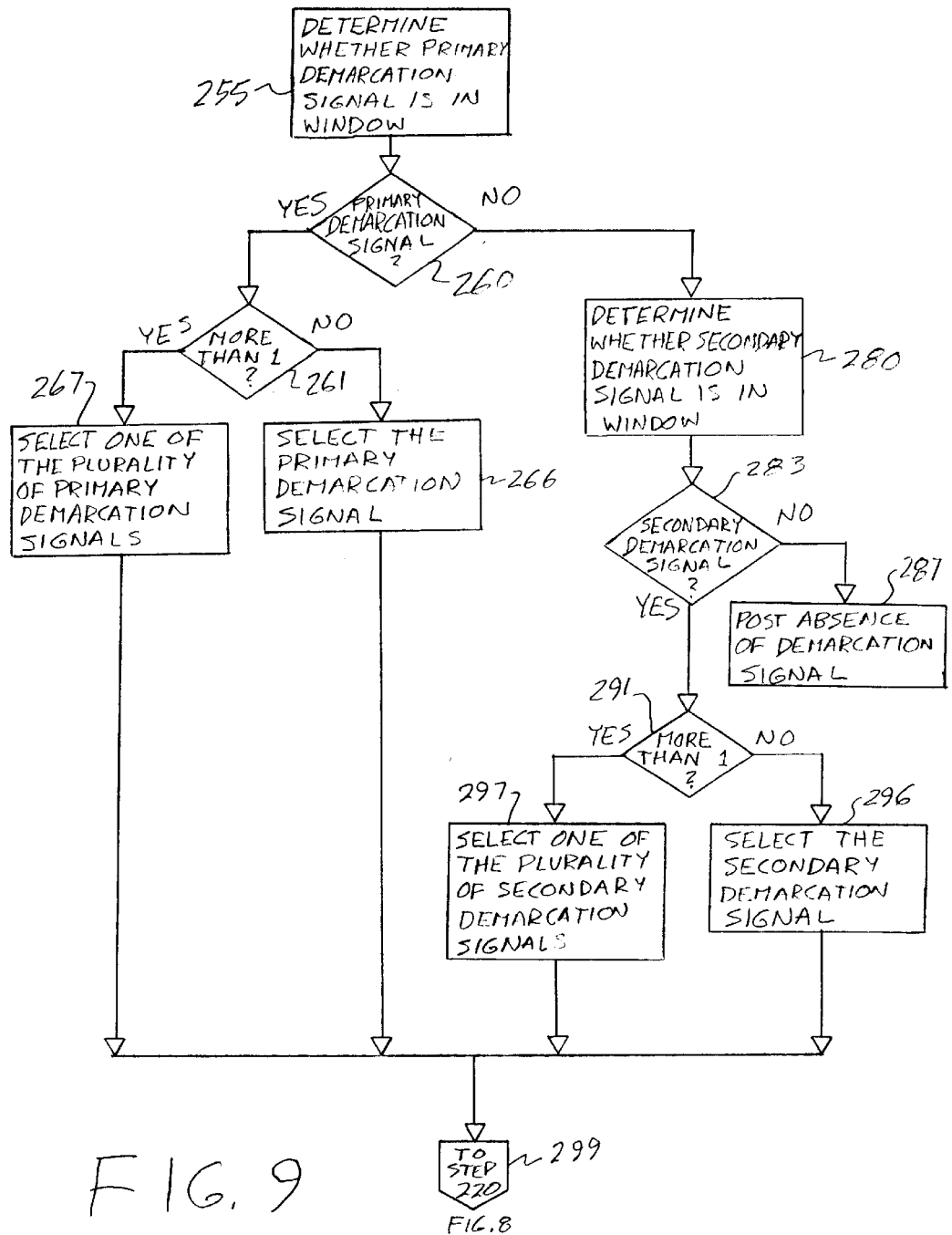
FIG. 9 is a flow chart depicting an alternative embodiment of a portion of the method of FIG. 8.

The hierarchical arrangement of types of data demarcation signals is represented in the embodiment of a method of the present invention illustrated in FIG. 9, replacing steps 205 through 214 of FIG. 8. Step 255 of FIG. 9 is similar to step 205, in this case determining whether a primary demarcation signal is in the window. If step 260 indicates a determination that at least one primary demarcation signal was present in the window, step 260 leads to step 261 to indicate whether more than one primary demarcation signal was determined to be present in the window. If one primary demarcation signal was determined to be present in the window, that primary demarcation signal is selected in step 266. If more than one primary demarcation signal was determined to be present in the window, a selection of one of the primary demarcation signals is made in step 267. As discussed above, any of the primary demarcation signals may be selected.

If step 260 indicates a determination that no primary demarcation signal was present in the window, step 260 leads to step 280 to determine whether a secondary demarcation signal is in the window. If step 283 indicates a determination that no secondary demarcation signal was present in the window, and step 260 indicates that no primary demarcation signal was present in the window, step 287 posts the absence of data demarcation signals for the window, for example, by setting flags 160 of the directory area 151 of FIG. 7 for that window to zero.

If step 283 indicates a determination that at least one secondary demarcation signal was present in the window, step 283 leads to step 291 to indicate whether more than one secondary demarcation signal was determined to be present in the window. If one secondary demarcation signal was determined to be present in the window, that secondary demarcation signal is selected in step 296. If more than one secondary demarcation signal was determined to be present in the window, a selection of one of the secondary demarcation signals is made in step 267. As discussed above, any of the secondary demarcation signals may be selected. Upon selecting the data demarcation signal, step 299 proceeds to step 220 of FIG. 8.

FIG. 10 illustrates an example of an alternative type of data demarcation signal, comprising a "beginning of record" indicator 300–305. In FIG. 10, data of track 309 is arranged in the form of data records, and "beginning of record" indicators may comprise special characters located after a gap between records or data sets (in the direction 308 which the tape is read and written) which identify the beginning of a record, as is known to those of skill in the art. In accordance with the present invention, beginning of record indicator 302 is determined to lie within the window 310, and beginning of record indicators 304 and 305 are determined to lie within the window 311. The locations of the selected data demarcation signals are determined from the servo track or tracks 312.

FIG. 11 illustrates how servo defect areas may be employed in accordance with the present invention. In FIG. 11, the data of track 320 is arranged in the form of data records, and servo defect areas 330–333 of servo track or tracks 337 are employed as data demarcation signals. Servo defect areas are identified by the servo system of the recording control 19 of FIG. 2, and the data storage logic 24 selects a data set which is subsequent to the servo defect area (in the direction 338 which the tape is read and written) so that the servoing is correct, and the data set is valid. Thus, in FIG. 11, the data storage logic selects data set 340, as is shown by arrow 341, as a valid data set subsequent to servo defect area 330, for window 342. For window 343, the data storage logic determines that data sets 345 and 346 are valid data sets subsequent to, respectively, servo defect areas 332 and 333, as shown by arrows 347 and 348, and selects one of the data sets. Since the selected data sets are subsequent to the servo defect areas, the locations of the selected data demarcation signals are determined from the servo track or tracks 337.

Those of skill in the art will understand that still further data demarcation signals can be derived from the magnetic tape data storage medium.

While the preferred embodiments of the present invention have been illustrated in detail, it should be apparent that modifications and adaptations to those embodiments may occur to one skilled in the art without departing from the scope of the present invention as set forth in the following claims.

I claim:

1. A data storage system for recording data in at least one longitudinal track on a magnetic tape data storage medium, said data having data demarcation signals, comprising:

data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said data demarcation signals is located in at least one of said windows;

if at least one of said data demarcation signals is located in one of said windows, selects one of said at least one of said data demarcation signals for said window; and identifies, in said directory, said selected data demarcation signal as within said window.

2. The data storage system of claim 1, wherein said data storage logic, additionally:

if no said data demarcation signal is located in said window, identifies, in said directory, an absence of data demarcation signals within said window.

3. The data storage system of claim 1, wherein said at least one longitudinal track is read and/or written in a first direction, and wherein said data storage logic establishes said window at each intersection between said fixed regions, said window extending into the one of said regions located from said intersection opposite said first direction.

4. The data storage system of claim 3, wherein said data storage logic, additionally establishes said window as extending into said one of said regions at least one quarter the total length of said one of said regions.

5. The data storage system of claim 4, wherein said data storage logic, additionally establishes said window as additionally extending into the one of said regions located from said intersection in said first direction.

6. The data storage system of claim 1, wherein said data is arranged in the form of data files, and wherein said data demarcation signals comprise filemarks.

7. The data storage system of claim 1, wherein said data is arranged in the form of data records, and wherein said data demarcation signals comprise the start of a record.

8. The data storage system of claim 1, wherein said data is arranged in the form of data records, and wherein said data demarcation signals comprise servo defect areas.

9. A data storage system for recording data in at least one longitudinal track on a magnetic tape data storage medium, wherein said data is arranged in the form of data files separated by data demarcation signals, said data demarcation signals comprising filemarks, comprising:

data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said filemark data demarcation signals is located in at least one of said windows;

if at least one of said filemark data demarcation signals is located in one of said windows, selects one of said at least one of said filemark data demarcation signals for said window; and identifies, in said directory, said selected filemark data demarcation signal as within said window.

10. The data storage system of claim 9, wherein said data files are recorded in the form of at least one data record, said data records having secondary demarcation signals, wherein said filemarks comprise primary demarcation signals; and, said data storage logic, additionally:

determines whether a filemark primary demarcation signal is located in a window; and if no filemark primary demarcation signal is located in said window, determines whether a secondary demarcation signal is located in said window; if at least one of said secondary demarcation signals is located in one of said windows, selects one of said at least one of said secondary demarcation signals for said window; and identifies, in said directory, said selected secondary demarcation signal as within said window.

11. A data storage system for recording data in at least one longitudinal track on a magnetic tape data storage medium, said data having data demarcation signals, said magnetic tape data storage medium having longitudinal position signals encoded thereon, comprising:

data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said data demarcation signals is located in at least one of said windows;

if at least one of said data demarcation signals is located in one of said windows, selects one of said at least one of said data demarcation signals for said window;

reads said encoded longitudinal position signals of said magnetic tape data storage medium at substantially the location of a data set of said selected data demarcation signal; and identifies, in said directory, said selected data demarcation signal as within said window; and identifies, in said directory, said read location of said data set of said selected data demarcation signal.

12. The data storage system of claim 11, wherein said longitudinal track is read and/or written in a first direction; and wherein said data storage logic:

establishes said window at each intersection between said fixed regions, said window extending into the one of said regions located from said intersection opposite said first direction; and if said data storage logic determines that a plurality of said data demarcation signals are located in said window, selects the data demarcation signal closest to the end of said window extending into said opposite direction.

13. A data storage system for recording data on a magnetic tape data storage medium, comprising:

at least one drive mechanism for moving a magnetic tape data storage medium longitudinally along a tape path;

a read/write head positioned in said tape path for recording data on a magnetic tape data storage medium in the form of at least one longitudinal track;

a recording control operating said read/write head to record data on said magnetic tape data storage medium, said data having data demarcation signals; and data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said data demarcation signals is located in at least one of said windows;

if at least one of said data demarcation signals is located in one of said windows, selects one of said at least one of said data demarcation signals for said window; and identifies, in said directory, said selected data demarcation signal as within said window.

14. The data storage system of claim 13, wherein said data storage logic, additionally:

if no said data demarcation signal is located in said window, identifies, in said directory, an absence of data demarcation signals within said window.

15. The data storage system of claim 13, wherein said recording control operates said read/write head to read and/or write said at least one longitudinal track in a first direction; and wherein said data storage logic establishes said window at each intersection between said fixed regions, said window extending into the one of said regions located from said intersection opposite said first direction.

16. The data storage system of claim 15, wherein said data storage logic, additionally establishes said window as extending into said one of said regions at least one quarter the total length of said one of said regions.

17. The data storage system of claim 16, wherein said data storage logic, additionally establishes said window as additionally extending into the one of said regions located from said intersection in said first direction.

18. The data storage system of claim 13, wherein said recording control operates said read write head to arrange said data in the form of data files, and wherein said data demarcation signals comprise filemarks.

19. The data storage system of claim 13, wherein said recording control operates said read/write head to arrange said data in the form of data records, and wherein said data demarcation signals comprise the start of a record.

20. The data storage system of claim 13, wherein said recording control operates said read/write head to arrange said data in the form of data records and to identify servo defect areas, and wherein said data demarcation signals comprise said identified servo defect areas.

21. A data storage system for recording data on a magnetic tape data storage medium, comprising:

at least one drive mechanism for moving a magnetic tape data storage medium longitudinally along a tape path;

a read/write head positioned in said tape path for recording data on a magnetic tape data storage medium in the form of at least one longitudinal track;

a recording control operating said read/write head to record data on said magnetic tape data storage medium, and arranging said data in the form of data files separated by data demarcation signals, said data demarcation signals comprising filemarks; and data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said filemark data demarcation signals is located in at least one of said windows;

if at least one of said filemark data demarcation signals is located in one of said windows, selects one of said at least one of said file data demarcation signals for said window; and identifies, in said directory, said selected filemark data demarcation signal as within said window.

22. The data storage system of claim 21, wherein:

said recording control, additionally operates said read/write head to record said data files in the form of at least one data record, said data records having secondary demarcation signals, wherein said filemarks comprise primary demarcation signals; and said data storage logic, additionally:

determines whether a filemark primary demarcation signal is located in a window; and if no filemark primary demarcation signal is located in said window, determines whether a secondary demarcation signal is located in said window; if at least one of said secondary demarcation signals is located in one of said windows, selects one of said at least one of said secondary demarcation signals for said window; and identifies, in said directory, said selected secondary demarcation signal as within said window.

23. A data storage system for recording data in at least one longitudinal track on a magnetic tape data storage medium, said magnetic tape data storage medium having longitudinal position signals encoded thereon, comprising:

at least one drive mechanism for moving said magnetic tape data storage medium longitudinally along a tape path;

a read/write head positioned in said tape path for recording data on a magnetic tape data storage medium in the form of said at least one longitudinal track, and for sensing said longitudinal position signals;

a recording control operating said read/write head to record data on said magnetic tape data storage medium, said data having data demarcation signals, and for reading said sensed longitudinal position signals; and data storage logic for providing a data storage directory for said data recorded on said magnetic tape data storage medium, said data storage logic:

arranges a map of said at least one longitudinal track of said magnetic tape data storage medium into a plurality of fixed regions;

establishes a window at each intersection between said fixed regions, said window extending into at least one of said regions;

determines whether at least one of said data demarcation signals is located in at least one of said windows;

if at least one of said data demarcation signals is located in one of said windows, selects one of said at least one of said data demarcation signals for said window;

reads said encoded longitudinal position signals of said magnetic tape data storage medium at substantially the location of a data set of said selected data demarcation signal; and identifies, in said directory, said selected data demarcation signal as within said window; and identifies, in said directory, said read location of said data set of said selected data demarcation signal.

24. The data storage system of claim 23, wherein said recording control operates said read/write head to read and/or write said at least one longitudinal track in a first direction; and wherein said data storage logic:

establishes said window at each intersection between said fixed regions, said window extending into the one of said regions located from said intersection opposite said first direction; and if said data storage logic determines that a plurality of said data demarcation signals are located in said window, selects the data demarcation signal closest to the end of said window extending into said opposite direction.

25. A method for providing a directory for mapping data of a magnetic tape data storage medium, wherein said data is recorded in at least one longitudinal track on said magnetic tape data storage medium, said data having data demarcation signals, said method comprising the steps of:

arranging a map of said at least one longitudinal track of said magnetic tape data storage medium into a plurality of fixed regions;

establishing a window at each intersection between said fixed regions, said window extending into at least one of said regions;

determining whether at least one of said data demarcation signals is located in at least one of said windows;

if at least one of said data demarcation signals is located in one of said windows, selecting one of said at least one of said data demarcation signals for said window; and identifying, in said directory, said selected data demarcation signal as within said window.

26. The method of claim 25, additionally comprising the step of:

if no said data demarcation signal is located in said window, identifying, in said directory, an absence of data demarcation signals within said window.

27. The method of claim 25, wherein said at least one longitudinal track is read and/or written in a first direction, and wherein said step of establishing a window comprises establishing a window at each intersection between said fixed regions, said window extending into the one of said regions located from said intersection opposite said first direction.

28. The method of claim 27, wherein said step of establishing a window additionally comprises establishing said window as extending into said one of said regions at least one quarter the total length of said one of said regions.

29. The method of claim 28, wherein said step of establishing a window additionally comprises establishing said window as additionally extending into the one of said regions located from said intersection in said first direction.

30. The method of claim 25, wherein said data is arranged in the form of data files, and wherein said data demarcation signals comprise filemarks.

31. The method of claim 25, wherein said data is arranged in the form of data records, and wherein said data demarcation signals comprise the start of a record.

32. The method of claim 25, wherein said data is arranged in the form of data records, and wherein said data demarcation signals comprise servo defect areas.

33. A method for providing a directory for mapping data of a magnetic tape data storage medium, wherein said data is recorded in at least one longitudinal track on said magnetic tape data storage medium, and wherein said data is arranged in the form of data files separated by data demarcation signals, said data demarcation signals comprising filemarks, said method comprising the steps of:

arranging a map of said at least one longitudinal track of said magnetic tape data storage medium into a plurality of fixed regions;

establishing a window at each intersection between said fixed regions, said window extending into at least one of said regions;

determining whether at least one of said filemark data demarcation signals is located in at least one of said windows;

if at least one of said filemark data demarcation signals is located in one of said windows, selecting one of said at least one of said filemark data demarcation signals for said window; and identifying, in said directory, said selected filemark data demarcation signal as within said window.

34. The method of claim 33, wherein said data files are recorded in the form of at least one data record, said data records having secondary demarcation signals, wherein said filemarks comprise primary demarcation signals; and, said step of determining whether at least one of said data demarcation signals is located in at least one of said windows, comprises determining whether a filemark primary demarcation signal is located in a window; and, if no filemark primary demarcation signal is located in said window, determining whether a secondary demarcation signal is located in said window.

35. A method for providing a directory for mapping data of a magnetic tape data storage medium, wherein said data is recorded in at least one longitudinal track on said magnetic tape data storage medium, said data having data demarcation signals, said magnetic tape data storage medium having longitudinal position signals encoded thereon, said method comprising the steps of:

arranging a map of said at least one longitudinal track of said magnetic tape data storage medium into a plurality of fixed regions;

establishing a window at each intersection between said fixed regions, said window extending into at least one of said regions;

determining whether at least one of said data demarcation signals is located in at least one of said windows;

if at least one of said data demarcation signals is located in one of said windows, selecting one of said at least one of said data demarcation signals for said window;

reading said encoded longitudinal position signals of said magnetic tape data storage medium at substantially the location of a data set of said selected data demarcation signal; and identifying, in said directory, said selected data demarcation signal as within said window; and identifying, in said directory, said read location of said data set of said selected data demarcation signal.

36. The method of claim 35, wherein said longitudinal track is read and/or written in a first direction, and wherein said step of establishing a window comprises establishing a window at each intersection between said fixed regions, said window extending into the one of said regions located from said intersection opposite said first direction; and wherein, if said determining step determines that a plurality of said demarcation signals are located in said window, said step of selecting one of said at least one of said demarcation signals additionally comprises selecting the data demarcation signal closest to the end of said window extending into said opposite direction.

37. A removable data storage cartridge, comprising:

a magnetic tape data storage medium, wherein data is recorded in at least one longitudinal track on said magnetic tape data storage medium, said recorded data having data demarcation signals; and a memory for storing information, said information comprising a directory; said directory mapping said at least one longitudinal track of said magnetic tape data storage medium into a plurality of fixed regions; if at least one of said data demarcation signals is located in at least one of a plurality of windows, said windows established at each intersection between said fixed regions, each said window extending into at least one of said regions, said directory identifying a selected one of said at least one of said data demarcation signals located in said window, as within said window.

38. The removable data storage cartridge of claim 37, wherein said memory directory, additionally, if no said data demarcation signal is located in said window, identifying an absence of data demarcation signals within said window.

39. The removable data storage cartridge of claim 37, wherein said at least one longitudinal track is read and/or written in a first direction, and wherein said memory directory windows are established at each intersection between said fixed regions, each said window extending into the one of said regions located from said intersection opposite said first direction.

40. The removable data storage cartridge of claim 39, wherein said memory directory windows are additionally established as extending into said one of said regions at least one quarter the total length of said one of said regions.

41. The removable data storage cartridge of claim 40, wherein said memory directory windows are additionally established as additionally extending into the one of said regions located from said intersection in said first direction.

42. The removable data storage cartridge of claim 37, wherein said recorded data is arranged in the form of data files, and wherein said data demarcation signals comprise filemarks.

43. The removable data storage cartridge of claim 37, wherein said recorded data is arranged in the form of data records, and wherein said data demarcation signals comprise the start of a record.

44. The removable data storage cartridge of claim 37, wherein said recorded data is arranged in the form of data records, and wherein said data demarcation signals comprise servo defect areas.

45. A removable data storage cartridge, comprising:

a magnetic tape data storage medium, wherein data is recorded in at least one longitudinal track on said magnetic tape data storage medium, said recorded data arranged in the form of data files separated by data demarcation signals, said data demarcation signals comprising filemarks; and a memory for storing information, said information comprising a directory; said directory mapping said at least one longitudinal track of said magnetic tape data storage medium into a plurality of fixed regions; if at least one of said filemark data demarcation signals is located in at least one of a plurality of windows, said windows established at each intersection between said fixed regions, each said window extending into at least one of said regions, said directory identifying a selected one of said at least one of said filemark data demarcation signals located in said window, as within said window.

46. The removable data storage cartridge of claim 45, wherein said recorded data is arranged in the form of at least one data record, said data records having secondary demarcation signals, wherein said filemarks comprise primary demarcation signals; and said memory directory:

if at least one of said filemark primary demarcation signals is located in at least one of a plurality of said windows, said directory identifying a selected one of said at least one of said filemark primary demarcation signals located in said window, as within said window;

else, if no filemark primary demarcation signal is located in said window, and, if at least one of said secondary demarcation signals is located in said window, said directory identifying a selected one of said at least one of said secondary demarcation signals located in said window, as within said window.

47. A removable data storage cartridge, comprising:

a magnetic tape data storage medium, wherein data is recorded in at least one longitudinal track on said magnetic tape data storage medium, said recorded data having data demarcation signals, said magnetic tape data storage medium having longitudinal position signals encoded thereon; and a memory for storing information, said information comprising a directory; said directory mapping said at least one longitudinal track of said magnetic tape data storage medium into a plurality of fixed regions; if at least one of said data demarcation signals is located in at least one of a plurality of windows, said windows established at each intersection between said fixed regions, each said window extending into at least one of said regions, said directory identifying a selected one of said at least one of said data demarcation signals located in said window, as within said window; and said directory identifying a location of said data set of said selected data demarcation signal, said location comprising encoded longitudinal position signals of said magnetic tape data storage medium at substantially the location of a data set of said selected data demarcation signal.

48. The removable data storage cartridge of claim 47, wherein said longitudinal track is read and/or written in a first direction, and wherein said memory directory window are established at each intersection between said fixed regions, said window extending into the one of said regions located from said intersection opposite said first direction; and, if a plurality of said data demarcation signals is located in at least one of a plurality of windows, said directory identifying the data demarcation signal closest to the end of said window extending into said opposite direction, as within said window.

* * * * *